(12) United States Patent
Issartel

(10) Patent No.: US 11,945,988 B2
(45) Date of Patent: Apr. 2, 2024

(54) FLAME RETARDANT PRODUCT, METHOD FOR MANUFACTURING SUCH A PRODUCT AND EXTINGUISHING DEVICE COMPRISING SUCH A PRODUCT

(71) Applicant: EITL, Vouneuil-sur-Vienne (FR)

(72) Inventor: Eric Issartel, Vouneuil-sur-Vienne (FR)

(73) Assignee: SUEZ GROUPE, Paris la Defense (FR)

( * ) Notice: Subject to any disclaimer, the term of this patent is extended or adjusted under 35 U.S.C. 154(b) by 0 days.

(21) Appl. No.: 16/479,038

(22) PCT Filed: Jan. 22, 2018

(86) PCT No.: PCT/EP2018/051412
§ 371 (c)(1),
(2) Date: Jul. 18, 2019

(87) PCT Pub. No.: WO2018/134393
PCT Pub. Date: Jul. 26, 2018

(65) Prior Publication Data
US 2021/0130696 A1    May 6, 2021

(30) Foreign Application Priority Data
Jan. 23, 2018   (FR) ...................................... 1750513

(51) Int. Cl.
| C09K 21/08 | (2006.01) |
| A62C 3/02 | (2006.01) |
| A62C 27/00 | (2006.01) |
| A62D 1/02 | (2006.01) |
| C09K 21/10 | (2006.01) |
| C09K 21/12 | (2006.01) |

(52) U.S. Cl.
CPC ............ *C09K 21/08* (2013.01); *A62C 3/0242* (2013.01); *A62C 27/00* (2013.01); *A62D 1/0071* (2013.01); *C09K 21/10* (2013.01); *C09K 21/12* (2013.01)

(58) Field of Classification Search
CPC ................................ A62C 2/065; C09K 21/14
See application file for complete search history.

(56) References Cited

U.S. PATENT DOCUMENTS

| 4,459,213 A * | 7/1984 | Uchida ................ A62D 1/0078 252/2 |
| 4,515,632 A | 5/1985 | Maurer et al. |
| 4,588,510 A * | 5/1986 | Salyer .................. A62D 1/0071 106/18.11 |
| 4,839,065 A * | 6/1989 | Vandersall ........... A62D 1/0035 106/14.05 |
| 6,989,113 B1 | 1/2006 | Mabey |
| 2008/0135263 A1 | 6/2008 | Millard |
| 2014/0202717 A1 | 7/2014 | Klaffmo |
| 2015/0335928 A1* | 11/2015 | Klaffmo .................. C08L 27/12 252/2 |

FOREIGN PATENT DOCUMENTS

| DE | 102006052819 A1 | 5/2008 |
| EP | 1056519 B1 | 4/2005 |
| RU | 2125459 C1 | 1/1999 |
| RU | 2007120754 A | 12/2008 |
| RU | 2531623 C2 | 10/2014 |
| SU | 1373406 A1 | 2/1988 |
| SU | 1517968 A1 | 10/1989 |
| WO | 20150134856 A1 | 9/2015 |

OTHER PUBLICATIONS

Corresponding Chinese Application No. 201880020058.9, Chinese Office action dated May 11, 2021.
Corresponding Russian Application No. 2019122742, Russian Office action dated Feb. 12, 2021.
International Search Report corresponding International application PCT/EP2018/051412 dated Apr. 11, 2018, 3 pages.
Corresponding Chinese Application No. 201880020058.9, Chinese Office action dated Oct. 9, 2021.
Cheng Yuanping, "Fire Control Engineering", China University of Mining and Technology Press, published on May 31, 2002, pp. 155-156.
Cheng Lingmin, "Food Processing Machinery", China Light Industry Press, published on Sep. 30, 1992, p. 15.
Han Zhanxian, "The Art of Subduing Fire Demon", Shandong Science and Technology Press, published on Apr. 30, 2001, pp. 213-214.
Chen Jian et al., "Principles of Food Chemistry", para. 2, South China University of Technology Press, published on Feb. 28, 2015, p. 106.
Lu Qiyu et al., "Food Technology", Henan Science and Technology Press, published on Sep. 30, 1998, pp. 289-290.

* cited by examiner

*Primary Examiner* — Peter F Godenschwager
(74) *Attorney, Agent, or Firm* — Ronald M. Kachmarik; Cooper Legal Group LLC

(57) ABSTRACT

A flame retardant product that contains an aqueous solution that includes a hydroxylated carbon-based component, an intumescent agent suitable for at least partially or even completely dehydrating the hydroxylated carbon-based component in such a way as to generate, under the effect of heat, a carbonaceous foam, and a thixotropic agent, selected to have a viscosity that increases as a result of water being added in the absence of shear. The solution has a sufficient concentration of the hydroxylated carbon-based component and the intumescent agent so that an addition of water to said solution increases the viscosity thereof in the absence of shear. The content by weight of the hydroxylated carbon-based component is greater than 10%.

31 Claims, No Drawings

FLAME RETARDANT PRODUCT, METHOD FOR MANUFACTURING SUCH A PRODUCT AND EXTINGUISHING DEVICE COMPRISING SUCH A PRODUCT

TECHNICAL FIELD

The present invention relates to flame retardant products for firefighting, methods for preparing these products, and fire extinguishing devices.

PRIOR ART

In order to combat the spread of a fire, a flame retardant product that slows the spread of the fire, or even reduces the intensity thereof, is conventionally dispersed on the supports to be protected, for example by means of a fire hose, a spray head of sprinkler type, a fire suppression aircraft, or a fire suppression helicopter.

A "short-term" flame retardant product is liquid and generally comprises more than 99% by weight of water. The flame retardant capacity of the short-term product derives mainly from consumption of the energy released by the fire, to evaporate the water. Because of its low viscosity, close to that of water, a short-term flame retardant product is easily dispersed. It can be used to protect a wide variety of supports. However, its low viscosity limits its adhesion.

A "long-term" flame retardant product is conventionally used to protect wooden supports. To this end, it comprises an intumescent agent, for example ammonium phosphate or ammonium sulfate in an aqueous solution.

Above a temperature higher than 80° C., the reaction of the intumescent agent with the cellulose in the wood produces both ammonia and phosphoric acid, resulting in acidification of the medium in which the reaction takes place. This acidification promotes dehydration of the cellulose. All that then remains of the original cellulose is a structure having a high carbon content, referred to as a "char layer", the thermal properties of which make it possible to reduce the thermal gradients in the mass of the wood and to retard its combustion. Moreover, the off-gas produced by the reaction of ammonium phosphate with cellulose causes intumescence, i.e. production of a carbonaceous foam, due to the expansion of cavities in the char layer.

The long-term flame retardant product typically has a high viscosity that allows it to adhere to the support for several days, or even several weeks, in order to prevent a fire from spreading. In order to disperse such a viscous product, specific devices capable of reaching high pressures are required. Such a product is therefore unsuitable for dispersion using conventional devices, like for example using a fire hose or a spray head of sprinkler type. In a long-term flame retardant product, the water acts as a solvent and/or as a vector for transporting the components of the product.

There is therefore a need for a flame retardant product that can be dispersed without using high pressures and is capable of effectively adhering to a support, for example a tree, a storage tank wall, in particular a hydrocarbon storage tank wall, or a building wall.

The object of the invention is to meet this need.

SUMMARY OF THE INVENTION

The subject matter of the present invention, according to a first embodiment, is a flame retardant product, referred to as "concentrated", consisting of an aqueous solution comprising:

a hydroxylated carbon-based component,
an intumescent agent suitable for at least partially or even completely dehydrating the hydroxylated carbon-based component in such a way as to generate, under the effect of heat, a carbonaceous foam,
a thixotropic agent selected to have a viscosity that increases as a result of water being added in the absence of shear,
the aqueous solution having a sufficiently high concentration of the hydroxylated carbon-based component and the intumescent agent so that an addition of water to said solution increases the viscosity thereof in the absence of shear of said solution.

As will be discussed in further detail in the following description, a concentrated product according to the invention is easy to store, shows thixotropic behavior, and has a viscosity which, after addition of water, can be advantageously reduced by simple shear at the time of dispersion, and which, as soon as the shear is removed, typically as soon as the product has been placed on the support to be protected, shows an increased viscosity due to the addition of water, thus advantageously facilitating its adhesion to the support.

The low viscosity during dispersion, resulting from the shear, advantageously allows dispersion at low pressure.

Moreover, unlike known flame retardant products, which are effective only on supports comprising cellulose, a flame retardant product according to the invention comprises a hydroxylated carbon-based component that can react with the intumescent agent to form a carbonaceous foam. In other words, a flame retardant product according to the invention comprises all of the components necessary for generating the carbonaceous foam and can advantageously be used on supports that do not comprise cellulose or only small amounts thereof, for example on resinous trees, or even on hydrocarbons, or in order to retard fires of electrical origin. It can also be used on household or industrial waste.

Remarkably, a flame retardant product according to the invention can thus be universally applied.

A concentrated flame retardant product according to the invention can also include one or a plurality of the following optional characteristics:

the hydroxylated carbon-based component is selected from the group composed of carbohydrates, polyols, osamines and mixtures thereof and/or the intumescent agent comprises an element selected from the group composed of halogens, phosphorus, nitrogen, sulfur, zinc, aluminum, magnesium and mixtures thereof and/or the thixotropic agent is selected from the group composed of xanthan gum, gum arabic, Senegal gum, bentonite, cellulose ethers and mixtures thereof, with the hydroxylated carbon-based component preferably being selected from the group composed of saccharose, glucose, xylose, sorbitol, pentaerythritol, maltose, arabinose and mixtures thereof, and/or the intumescent and dehydrating agent is selected from the group composed of ammonium polyphosphate, diammonium phosphate, monoammonium phosphate, phosphoric acid, sulfuric acid, boric acid, urea phosphate, melamine phosphate, ammonium sulfate, ammonium borate and mixtures thereof, and/or the thixotropic agent is xanthan;

the thixotropic agent is selected from the group composed of xanthan gum, gum arabic, Senegal gum, cellulose ethers and mixtures thereof;

the hydroxylated carbon-based component is selected from the group composed of saccharose, glucose, fructose, xylose, sorbitol, pentaerythritol, maltose, arabinose and mixtures thereof;

the hydroxylated carbon-based component comprises saccharose and glucose;

the hydroxylated carbon-based component comprises saccharose and glucose and fructose;

the total content by weight of saccharose, glucose and fructose is greater than 5%, preferably greater than 10%, preferably greater than 15%, or even greater than 20% by weight percentage based on the weight of the flame retardant product;

the glucose content is greater than 5% by weight percentage based on the weight of the flame retardant product;

the saccharose content is greater than 5% by weight percentage based on the weight of the flame retardant product;

the fructose content is greater than 5% by weight percentage based on the weight of the flame retardant product;

the carbon-based component is derived from a sugar extraction process of a plant, and/or the intumescent agent is ammonium polyphosphate;

the carbon-based component comprises sugar, less than 10%, preferably less than 5%, preferably less than 1% by weight of the sugar of said carbon-based component being crystallizable;

the flame retardant product comprises, by weight, greater than 5% and less than 20% of xanthan gum;

less than 20% by weight of the thixotropic agent is hydrated;

the concentrated flame retardant product comprises, by weight, less than 0.5% of an antimicrobial agent and/or an antifungal agent;

the concentrated flame retardant product comprises, by weight, less than 0.5% of an anticorrosion agent.

The invention also relates to a method for producing a concentrated flame retardant product according to the invention. According to this method, the thixotropic agent is added to an aqueous solution comprising the hydroxylated carbon-based component and the intumescent agent, with the total content by weight of the hydroxylated carbon-based component and the intumescent agent being greater than 80%, greater than 90% or greater than 95% of the saturation weight content for which saturation is reached.

As will be discussed in further detail in the following description, this method advantageously limits the amount of water that can interact with the thixotropic agent on addition thereof. The thixotropic agent present in the concentrated flame retardant product is thus available for increasing the viscosity of the flame retardant product when this product is diluted.

Advantageously, the thixotropic agent therefore remains substantially inactive with respect to its effect on viscosity before this dilution. Nevertheless, a simple addition of water, in particular immediately before use of the flame retardant product, is sufficient to activate the thixotropic agent, and thus to increase the viscosity of the flame retardant product and to increase its adhesion capacity. Provisional shear, however, makes it possible to limit the viscosity of the flame retardant product at the time of its application.

In addition, the method reduces the amount of water available for the proliferation of microorganisms and fungi in the concentrated flame retardant product obtained by the method, and the corrosion of the receptacles in which the concentrated flame retardant product is contained.

The invention thus also relates to a concentrated flame retardant product, in particular according to the invention, obtained or obtainable by the production method according to the invention.

The invention also relates to a flame retardant product, referred to as "diluted", preferably ready to use, obtained by dilution in water of a concentrated flame retardant product according to the invention, wherein the ratio of the weight of water added to the total weight of the diluted product is preferably greater than 0.8.

The diluted flame retardant product preferably comprises greater than 1% and/or less than 8% by weight of an emulsifier.

The invention also relates to a fire extinguishing device comprising:
a tank containing a concentrated or diluted flame retardant product according to the invention,
a sprinkling device connected to said tank, and
optionally, a device for diluting the product coming from the tank and being fed to the sprinkling device.

The extinguishing device can in particular be selected from a group composed of a fire suppression aircraft, a fire suppression helicopter, in particular of the type conventionally used for extinguishing forest fires, a firefighting truck, or a stationary spray head of sprinkler type, in particular attached to a wall or to the ceiling of a building.

The invention also relates to a method for fighting a fire comprising the following steps:
i) dilution of a concentrated flame retardant product according to the invention so as to obtain a diluted flame retardant product according to the invention,
ii) application of shear to the diluted flame retardant product so as to reduce the viscosity thereof,
iii) application of the diluted and sheared flame retardant product to the support.

The method for firefighting according to the invention can in particular be implemented by means of a fire extinguishing device according to the invention. It can be used in particular to protect a support comprising less than 50%, less than 40%, less than 30%, less than 20%, or less than 10% of cellulose, by weight percentage, or even no cellulose.

The support can be selected from a tree, a storage tank wall, in particular a hydrocarbon storage tank wall, a building wall, and waste, in particular household and/or industrial waste.

The shear can result from mixing or simple displacement, for example in a pipe, or from passage through a nozzle.

Definitions

A "carbonaceous foam" is a cellular structure containing greater than 80%, greater than 90%, or even substantially 100% of carbon by weight.

"Molasses" are a residue of the sugar industry obtained at the end of the sugar crystallization stage (in particular saccharose, glucose or fructose). In particular, the sugar of molasses is substantially non-crystallizable. The molasses is in the form of an aqueous solution saturated with carbohydrates. In particular, it can contain glucose and saccharose and fructose. It generally contains by weight a minimum of 30% carbohydrates, more generally between 40% and 55%, as well as mineral salts and proteins. The carbohydrate content by weight of molasses can be greater than 60%. Sugarcane or beet molasses refers to molasses obtained in the production method of saccharose crystallized from sugarcane or beets respectively.

A material showing "thixotropic" rheological behavior is a material the viscosity of which decreases over time when it is sheared and the viscosity of which increases and stabilizes following a rest period, after said shear stops, to a value less than or equal to its initial value before said shear. A "thixotropic agent" is a substance suitable for modifying the rheological behavior of a material to make it thixotropic, possibly after activation by adding water.

The thixotropic agent of a concentrated flame retardant product according to the invention has a viscosity that increases as a result of water being added in the absence of shear. Thixotropic agents, in particular those having a viscosity that increases as a result of water being added in the absence of shear, are well known to the person skilled in the art.

A "saturated solution" is a liquid phase comprising a solvent, for example water, and a solute, in which addition of a component containing the solute stops the dilution thereof. The person skilled in the art knows how to determine the saturated state of a solution, with addition of the solute leading to the formation of precipitates.

A "hydrated" agent refers to an agent the molecules or ions of which, after placement in an aqueous solution, interact with the water molecules of the aqueous solution. In a saturated solution, the excess solute is not hydrated.

The "viscosity" of a material refers to the coefficient that relates the stress to which this material, whether solid or liquid, is subjected when it is sheared to a specific rate of deformation. Viscosity is expressed in Pa·s and is conventionally measured using a rheometer or a viscometer. Subsequently the viscosity measurements were carried out using a Brookfield type viscometer marketed under the brand name DV-I by the company LABOMAT.

"Rotation speed" corresponds to the speed, expressed in rotations (or "turns") per minute (or rpm), of the shaft of the Brookfield rheometer immersed in the solution for which the viscometer measures a viscosity.

A "deformation rate" is defined as a variation in speed relative to a variation in length. For example, in the case of a shear referred to as planar, a solid or liquid product is positioned between two parallel plates separated by a height h, one of the plates being stationary and the other moving at a speed s. The deformation rate is then equal to s/h. As a result, there is confusion between "deformation rate" and "shear rate". The "stress" corresponds to the force per surface unit of the plate exerted on the mobile or stationary plate in the direction of movement of the plate.

The term "impurities" refers to the inevitable components that are necessarily introduced with the raw materials.

The sugar of a carbon-based component is considered not to be "crystallizable" if it cannot be crystallized by the methods conventionally used in the sugar industry. Such methods are described for example in the article "Extraction of beet sugar", by Alfa ARZATE, of Oct. 27, 2005, published by the Maple Syrup Research, Development and Technological Transfer Center, or in the article "The extraction of sugar", by Prof. Mathlouthi and Ms. Barbara Rogé (CEDUS File). Molasses, which still contains sugar, but in a non-crystallizable form, is thus conventionally considered to be a waste product of this industry.

Unless otherwise specified, the contents of the various components are given in weight percentage.

DETAILED DESCRIPTION

Concentrated Product

The hydroxylated carbon-based component can preferably comprise a molar content of C and/or O and/or H, considering only O and H atoms in the form of hydroxyl groups OH, of greater than 40%, greater than 50%, greater than 60%, greater than 70%, greater than 80%, or greater than 90%, in mole percent based on the total number of moles of atoms of the hydroxylated carbon-based component.

In the hydroxylated carbon-based component, the ratio of the number of moles of hydroxyl groups OH to the number of moles of C is preferably greater than 0.2, greater than 0.5, greater than 1, greater than 2, greater than 3 and/or less than 10.

The hydroxylated carbon-based component can be selected from the group composed of carbohydrates, polyols, osamines, and mixtures thereof. It can be selected from a group composed of saccharose, glucose, xylose, sorbitol, pentaerythritol and its derivatives, maltose, arabinose and mixtures thereof. Preferably, the hydroxylated carbon-based component is derived from a sugar extraction process of a plant, preferably a sugar plant. The preferred hydroxylated carbon-based component is selected from the group composed of saccharose, glucose, pentaerythritol and its derivatives, and mixtures thereof.

The intumescent agent is suitable for modifying the pyrolysis conditions of the hydroxylated carbon-based component and/or the materials of the support to be protected if these materials comprise a hydroxylated substance, for example cellulose, so as to bring about the intumescence of the flame retardant product. The intumescent agent can comprise an element selected from a group composed of halogens, phosphorus, nitrogen, sulfur and mixtures thereof. Preferably, it comprises an element selected from the group composed of phosphorus and nitrogen, and mixtures thereof.

It can be selected from the group composed of ammonium polyphosphate, diammonium phosphate, monoammonium phosphate, phosphoric acid, sulfuric acid, boric acid, urea phosphate, melamine phosphate, ammonium sulfate, ammonium borate and mixtures thereof.

The preferred intumescent agent is ammonium polyphosphate.

The amounts of hydroxylated carbon-based component and intumescent agent are adjusted according to the nature of the hydroxylated carbon-based component and the nature of the intumescent agent so as to obtain an intumescent system capable of generating, under the effect of heat, a carbonaceous foam. The production of an intumescent system from a hydroxylated carbon-based component and an intumescent agent is well known to the person skilled in the art. All known intumescent systems can be used according to the present invention.

The amounts of the hydroxylated carbon-based component and the intumescent agent depend on their nature. The concentrated product can for example comprise 2 to 40% of a hydroxylated carbon-based component and 30 to 60% of an intumescent agent.

A concentrated product according to the invention preferably has a content by weight of the hydroxylated carbon-based component of greater than 5%, greater than 10%, even greater than 12.5%, even greater than 15% and/or less than 30%, less than 25%, less than 22.5%, or even less than 20%.

A content by weight of the hydroxylated carbon-based component of less than 5% does not allow the formation of a sufficient char layer. A content by weight of the hydroxylated carbon-based component of greater than 10% facilitates the formation of a considerable char layer that retards the spread of the fire.

According to a variant, the content of the hydroxylated carbon-based component can be greater than 20%, or even greater than 25%. The content by weight of the intumescent agent is preferably greater than 35%, greater than 40%, or even greater than 50%, and/or less than 55%.

Preferably, the ratio of the content by weight of the intumescent agent to that of the hydroxylated carbon-based component in the concentrated product is greater than 0.9, greater than 1.5, greater than 2, greater than 2.5, greater than 3, and/or less than 20, less than 10, or less than 4.

The thixotropic agent is suitable for modifying the rheological behavior of the flame retardant product. It can be selected from the group composed of xanthan gum, gum arabic, guar gum, locust bean gum, bentonite, sepiolite clay, montmorillonite, attapulgite, the algae family, cellulose derivatives (carboxymethylcellulose, CEC, CHC), sodium polyacrylate and its derivatives, Rhodopol, marketed by the company RHODIA, and mixtures thereof. It can be selected from the group composed of xanthan gum, gum arabic, guar gum, locust bean gum, sepiolite clay, montmorillonite, attapulgite, the algae family, cellulose derivatives (carboxymethylcellulose, CEC, CHC), sodium polyacrylate and its derivatives, Rhodopol, marketed by the company RHODIA, and mixtures thereof. The preferred thixotropic agent is xanthan gum.

The concentrated flame retardant product comprising xanthan gum is particularly well-suited for fighting a hydrocarbon fire, as the particles of xanthan gum do not expand on contact with the alcohol compounds produced by the hydrocarbon fire. The diluted retardant product can thus form a carbonaceous foam that floats on the hydrocarbons.

The thixotropic agent must not be completely hydrated in the concentrated flame retardant product. Preferably, less than 20%, less than 10%, less than 5%, less than 1%, less than 0.1%, or even substantially 0% by weight of the thixotropic agent is hydrated.

The presence of the thixotropic agent modifies the rheological behavior of the flame retardant product without substantially modifying the above-mentioned intumescent system. According to the invention, however, the intumescent system must be present in a sufficient amount so that the aqueous solution is close to saturation, or even saturated, so as to limit the amount of water available to the thixotropic agent. The product thus comprises thixotropic agent that is "free", i.e. available to react with added water so as to increase by this reaction the viscosity of the product in the absence of shear.

In the concentrated flame retardant product, the addition of the thixotropic agent therefore has only a minimal effect, or even no effect, on the viscosity.

The amounts of thixotropic agent depend on the nature thereof. The concentrated product can for example comprise 5 to 20% of a thixotropic agent.

Preferably, the content by weight of the thixotropic agent is greater than 7.5%, greater than 10%, greater than 12%, and/or less than 17.5%, or less than 15%.

The components other than the hydroxylated carbon-based component, the intumescent agent and the thixotropic agent are preferably water and impurities, for example mineral salts such as sodium chloride NaCl.

The amount of water is determined according to the amount and the nature of the hydroxylated carbon-based component and the intumescent agent in order to ensure that the free thixotropic agent (activatable by adding water) is present. In order to produce the concentrated flame retardant product, one can for example add 5 to 30% of water to the sources of the hydroxylated carbon-based component, the intumescent agent, and the thixotropic agent.

A content by weight of impurities of less than 3% is not considered to substantially modify the results. Preferably, the content by weight of impurities is less than 2%, and preferably less than 1%.

The concentrated flame retardant product according to the invention can show a thixotropic and/or shear thinning, or preferably Newtonian, rheological behavior. Preferably, for a rotation speed of between 20 rpm (rotations per minute) and 100 rpm, the viscosity is substantially constant. Preferably, the viscosity is greater than 100 cP (centipoises), greater than 300 cP, greater than 600 cP and/or less than 3000 cP, less than 2000 cP, or less than 1000 cP. Preferably, for a rotation speed of between 4 rpm (rotations per minute) and 100 rpm, the viscosity varies less than 20%, or even less than 10%, with respect to the maximum viscosity value measured in this range of rotation speeds.

Diluted Product

The diluted product is obtained by dilution in water of the concentrated flame retardant product according to the invention.

A ratio of the weight of water added to the total weight of the diluted product of greater than 0.8 is preferable for reducing the viscosity. A ratio of the weight of water added to the total weight of the product after dilution of greater than 0.99 reduces the efficacy of the diluted product.

Preferably, the ratio of the weight of water added to the total weight of the diluted product is greater than 0.85, greater than 0.9, greater than 0.92 and/or less than 0.99, less than 0.98, or less than 0.97. The preferred ratio of the weight of water added to the total weight of the diluted product is equal to 0.94.

Dilution by adding water to the concentrated product hydrates the available thixotropic agent. Thixotropic behavior of the diluted product can then develop.

In particular, the ratio of the viscosity of the concentrated product to that of the diluted product, with the viscosities being measured at a rotation speed of less than 4 rpm (rotations per minute) after dilution and before dilution, is preferably greater than 2, greater than 5, greater than 10, or greater than 20. After dilution, the ratio of the viscosity measured at a speed of less than 4 rpm to the viscosity measured at a speed of greater than 100 rpm is preferably greater than 2, greater than 5, greater than 10, or greater than 20. Such a ratio is particularly advantageous for improving flame retardant capacity, because the high viscosity at rest promotes adhesion of the diluted product to the supports to be protected and limits runoff of the diluted product onto the ground.

The viscosity of the diluted product, measured at a rotation speed of less than or equal to 4 rpm, can be greater than the viscosity of the concentrated product measured at the same rotation speed. The viscosity of the diluted product at a rotation speed of less than or equal to 4 rpm is preferably greater than 800 cP, greater than 2000 cP, greater than 3000 cP, greater than 4000 cP, greater than 5000 cP and/or less than 50000 cP, or less than 20000 cP.

The viscosity of the diluted product, measured at a rotation speed of greater than or equal to 100 rpm, can be less than the viscosity of the concentrated precursor product at the same rotation speed. The viscosity at a rotation speed of greater than or equal to 100 rpm is preferably less than 700 cP, less than 500 cP, less than 300 cP and/or greater than 10 cP, or greater than 20 cP.

In addition to an advantageous firefighting effect, the thixotropic properties of the diluted product limit sedimentation and improve the preservation of the diluted product.

The diluted flame retardant product can also comprise greater than 1% and/or less than 8% by weight of an emulsifier.

The emulsifier can in particular be a protein-containing surfactant, i.e. that contains hydrolyzed proteins, or a synthetic surfactant, or a development of these surfactants, in particular an AR (alcohol resistant), AFFF (agent forming a floating film), FFFP (agent forming a protein floating film), APPPP (agent producing a polyvalent protective film), or AMM (foaming wetting agent) development. The emulsifier can in particular fluorine.

Production Method

The production method of a concentrated product according to the invention can comprise the following successive steps:
a) preparation of a solution comprising an intumescent agent and a hydroxylated carbon-based component, and optionally water, so as to form an intumescent system generating, under the effect of heat, a carbonaceous foam,
b) mixing of a thixotropic agent with the solution obtained in step a),
the solution obtained at the end of step a) being such that the total content by weight of the hydroxylated carbon-based component and the intumescent agent is greater than 80%, greater than 90%, or greater than 95%, and preferably greater than 99%, of the saturation weight content at which saturation is reached, or even equal to or indeed greater than said saturation content,
the thixotropic agent being selected so that an addition of water to the solution obtained at the end of step b) increases the viscosity thereof in the absence of shear, and so that shear applied to the solution obtained at the end of step b) decreases the viscosity thereof.

A hydroxylated carbon-based component can be in liquid form or else in the form of a powder. Preferably, it is in liquid form, preferably in an aqueous solution, preferably saturated with the hydroxylated carbon-based component. A raw material comprising a preferred hydroxylated carbon-based component is a residue derived from a sugar extraction process of a plant, preferably a sugar plant, for example molasses. Preferably, the raw material comprising a hydroxylated carbon-based component is selected from the group composed of sugarcane molasses, beet molasses, and mixtures thereof.

Molasses impart excellent stability to the concentrated flame retardant product obtained by the production method according to the invention.

In other words, after a storage period in a hermetically sealed receptacle of greater than 1 month, greater than 3 months, greater than 6 months, or greater than 1 year, the sugars contained in the molasses are not decanted in the concentrated retardant product. This effect is attributed to the fact that as the sugars contained in the molasses are minimally crystallizable or even substantially non-crystallizable, water loss by evaporation of the concentrated flame retardant product does not induce precipitation of the sugars.

Preferably, the raw material comprising the hydroxylated carbon-based component is in the form of a first liquid composition comprising a first solvent that is preferably aqueous and is preferably in water, in which the hydroxylated carbon-based component is dispersed.

Preferably, the content by weight of the hydroxylated carbon-based component of the first liquid composition is greater than 90%, preferably greater than 95%, preferably greater than 99%, or even greater than the content by weight from which the liquid composition is saturated with the hydroxylated carbon-based component.

Preferably, the raw material comprising the hydroxylated carbon-based component is an aqueous solution containing sugars that comprises by weight less than 10%, preferably less than 5%, or even less than 1% of crystallizable sugars.

Preferably, the raw material comprising the hydroxylated carbon-based component comprises glucose and fructose and saccharose.

Preferably, the raw material comprising the hydroxylated carbon-based component comprises by weight greater than 30%, and preferably greater than 40% of hydroxylated carbon-based component. It can comprise greater than 50%, even greater than 60%, or even greater than 70% by weight of hydroxylated carbon-based component.

Preferably, the raw material comprising the hydroxylated carbon-based component is molasses.

An intumescent and dehydrating agent can be in solid form, or in the form of a powder, or preferably in liquid form, preferably in an aqueous solution, and preferably saturated with an intumescent agent. A raw material comprising an intumescent agent can be selected, for example, from fertilizers for soil fertilization, in particular a fertilizer in the form of a liquid solution of ammonium polyphosphate, referred to as ammonium polyphosphate 10-34-0.

The raw material comprising the intumescent agent, preferably in liquid form, can comprise by weight less than 20%, preferably less than 10%, preferably less than 3% of water, or preferably less than 1% of water, or can even be water-free.

The raw material comprising the intumescent agent can be a second liquid composition comprising a second solvent, preferably aqueous, in particular water, in which the intumescent agent is dissolved. Preferably, the content by weight of the intumescent agent in the second composition is greater than 90%, preferably greater than 95%, preferably greater than 99%, or even greater than the content by weight of the intumescent agent from which the second liquid composition is saturated with the intumescent agent. A thixotropic agent can be in the form of a powder or a liquid, preferably pasty, or a gum. A preferred raw material comprising a thixotropic agent is a xanthan gum.

The person skilled in the art knows, for example based on routine experience, how to select the thixotropic agent and adjust the amount of thixotropic agent necessary in order to adjust the viscosity of the diluted product so that it is suitable for dispersion on the surfaces to be protected, so that an addition of water to the solution obtained at the end of step b) increases the viscosity thereof in the absence of shear, and so that shear applied to the solution obtained at the end of step b) decreases the viscosity thereof.

Conventional thixotropic agents can be particularly suitable.

Preferably, when the thixotropic agent is xanthan gum, its content by weight in the concentrated product is greater than 5%, greater than 7.5%, greater than 10%, greater than 12%, and/or less than 17.5%, less than 15%, or less than 20%.

Preferably, in step a), the solution is prepared by mixing a raw material comprising the hydroxylated carbon-based component with a raw material comprising the intumescent agent.

Preferably, the raw material comprising the hydroxylated carbon-based component is molasses, for example sugarcane molasses and/or beet molasses. Preferably, the raw material comprising the intumescent agent is ammonium polyphosphate, for example ammonium polyphosphate 10-34-0.

If the solution prepared in step a) is obtained by mixing a raw material comprising a hydroxylated carbon-based component, for example sugarcane molasses or beet molasses, with a raw material comprising an intumescent agent, for example ammonium polyphosphate 10-34-0, the ratio of the weight of the raw material comprising the intumescent agent to the weight of the raw material comprising the hydroxylated carbon-based component is preferably greater than 0.3, greater than 0.6 and/or less than 2, or less than 1.6.

Preferably, a first aqueous solution is prepared by saturating it with a raw material comprising a hydroxylated carbon-based component, and a second aqueous solution is prepared by saturating it with a raw material comprising an intumescent agent, after which said first and second solutions are mixed to prepare the solution obtained in step a).

The person skilled in the art knows how to adjust the proportions of the raw materials according to their quality in order to obtain a concentrated product according to the invention. In particular, he knows how to adjust the proportions of hydroxylated carbon-based component and intumescent agent in order to obtain a concentrated product that develops a carbonaceous foam via combustion.

Preferably, in step a), less than 10%, and preferably less than 3% of free water is added in weight percentage based on the weight of the intumescent system. "Free water" refers to an aqueous component comprising, by weight, greater than 80%, preferably greater than 90%, preferably greater than 95%, or even greater than 99% of water.

A diluted product according to the invention can be advantageously used in conventional extinguishing devices that shear the firefighting flame retardant products at high deformation rates.

The flame retardant product according to the invention, in particular the concentrated product, can advantageously be packaged so as to be made available to firefighting personnel, for example in the form of receptacles or cannisters or any other packaging means that is easily transportable, in particular manually. For example, it can be conveyed to the site of a fire in a tank towed by a truck.

The dilution system of the extinguishing device can for example comprise a dosing pump that supplies the desired content of the concentrated product and water and a mixer in order to obtain a diluted product according to the invention. The dosing pump can for example be connected to the extinguishing device by a fire hose, for spraying of the diluted product. The flame retardant product can be stored in a tank in diluted form, for example in the tank of a firefighting truck.

The tank of the extinguishing device can be the airdrop tank of a means of a fire suppression aircraft or a fire suppression helicopter. This aerial means may comprise, in addition to the airdrop tank, a tank containing the concentrated product that can be connected to the airdrop tank. In this manner, dilution can be carried out in the airdrop tank, for example after filling following landing of the fire suppression aircraft on a body of water.

The extinguishing device according to the invention makes it possible to effectively fight a fire, in particular by retarding the ignition of the materials to be protected, and by reducing the maximum heat release rate during the fire as well as the total amount of heat released by the fire.

In order to apply a flame retardant product according to the invention to a support to be protected, the user can proceed in the following manner:

He selects a concentrated product, stored for example in a cannister. He measures out an amount of this product, which he pours for example into a tank. He then prepares a diluted product by proceeding with an addition of water in the proportions specified above. Alternatively, he can first pour the water into the tank, followed by the concentrated flame retardant product, or else can also add the concentrated flame retardant product and the water together. Preferably, the user can proceed with homogenization of the diluted product, for example by mixing using an electric mixer, or else manually using a spatula during or else after pouring the water and the concentrated product.

At the end of this preparation step, the viscosity of the diluted product increases by thixotropy, as the available thixotropic agent of the concentrated product undergoes hydration on contact with the added water. The chemical bonds created between the thixotropic agent and the water facilitate the increase in viscosity of the diluted product. The user can simply note this increase by observing the consistency of the diluted product, which is converted from a substantially liquid state immediately after pouring of the concentrated product and the water to a substantially pasty state in the minutes following the dilution.

Using a sprinkling device, for example a feed pump connected to a fire hose, the user applies a low pressure to the diluted product, which is sheared as a result. The viscosity of the diluted product then decreases, as some of the chemical bonds between the thixotropic agent and the water are temporarily broken. The diluted product then easily transits from the tank, where it is at rest, to a spray opening of the device.

The low-viscosity diluted product is dispersed on a support to be protected, for example a tree trunk. Because of this low viscosity, it easily spreads on the surface of the support to cover it. As the shear rate drops to zero, the product then being at rest, the viscosity of the product increases by thixotropy. The adhesion of the diluted product to the support is facilitated as a result.

During a fire, the heat released triggers pyrolysis of the flame retardant product. The intumescent agent reacts with the hydroxylated carbon-based component. The hydroxylated carbon-based component is dehydrated, creating a char layer, and the off-gas produced by the reaction facilitates the intumescence of this protective layer on the surface of the support to be protected.

EXAMPLES

The following examples, which are not limiting, are given for illustrative purposes.

In order to produce concentrated flame retardant products, the following raw materials were used:

solution of liquid ammonium polyphosphate 10-34-0, referred to below as APP, provided by the company PRAYON, sorbitol in solid form provided by the company GPR RECTAPUR, xylose in solid form provided by the company GPR RECTAPUR, beet molasses provided by the company GOLDSAFT, beet molasses provided by the company FRANCE MELASSE.

sugarcane molasses,
saccharose in solid form provided by the company GPR RECTAPUR,
glucose in solid form provided by the company GPR RECTAPUR.
xanthan gum provided by the company JUNGBUNZLAUER.

The compositions of the concentrated products are shown in Table 1.

In order to prepare the concentrated products, the raw materials are first separately weighed. The solid raw materials comprising hydroxylated carbon-based components are diluted in water in a receptacle until saturation of the aqueous solution. The solution of ammonium polyphosphate 10-34-0 (APP) is then poured into the receptacle. The mixture is then homogenized using an agitator. Table 1 shows the relative amounts of APP and aqueous solution saturated with the hydroxylated carbon-based component poured into the receptacle in this step (APP/S column).

In the following step, xanthan gum is added to the receptacle containing the mixture obtained so as to obtain the desired content by weight in the concentrated product, and the mixture is then homogenized.

The solution of ammonium polyphosphate, the aqueous solution saturated with the hydroxylated carbon-based component, and xanthan gum accounts for 100% of the composition of the various examples.

Examples 13 and 14, which are not part of the invention, are presented for comparative purposes. The diluted product of example 13 consists of a composition based on 80% water and 20% APP conventionally used for fighting forest fires. The flame retardant product of example 14 is water.

In order to prepare a diluted product, water and a concentrated flame retardant product are weighed separately and then poured into a receptacle, with the order of pouring having no effect on the properties of the diluted flame retardant product.

The viscosities of the concentrated and diluted flame retardant products of the various examples are measured using a Brookfield rheometer.

The adhesion capacity of a diluted product on a support is estimated by measuring in grams (g) the weight placed on a 100 g poplar wood board. For this purpose, the wooden board is immersed vertically for 30 seconds in a receptacle containing a diluted flame retardant product and is then weighed. The increase in the weight of the wooden board before and after immersion allows the adhesion of the diluted product to be evaluated.

The fire protection properties of a diluted flame retardant product are evaluated in the following manner: a wooden board is immersed vertically in a receptacle containing a diluted flame retardant product for 30 seconds and then tested using a cone calorimetry combustion device that measures the following parameters, which indicate the efficacy of fire protection:

1. the time to ignition TTI, expressed in seconds (s), corresponds to the time elapsed from the beginning of the test until the wooden board ignites,
2. the peak heat release rate PHHR, expressed in kW/m$^2$, corresponds to the maximum value of the heat released by combustion of the wooden board,
3. the total heat release THR due to combustion of the wooden board, expressed in kJ/m$^2$.

The cone calorimetry combustion test can for example be carried out using the device developed by the NIST (National Institute of Standards and Technology, Gaithersburg, USA).

The combustion test is carried out as follows. A wooden board impregnated with a diluted flame retardant product according to the protocol described above is placed horizontally in a cup, the cup being placed on a balance that measures the weight loss of the wooden board as a function of time. The wooden board is exposed on its upper surface to a heat flow of 35 kW/m$^2$ generated by a heating cone, corresponding to the heat flow released by a fire in progress, which causes an increase in the temperature of the wooden board. A spark is produced in a regular manner above the exposed surface until the wooden board ignites. The time to ignition TTI is measured when the first flame appears. The gases produced by the combustion are collected and analyzed by a sensor located vertically above the sample and the heating cone. The amount of oxygen contained in the gases produced by the combustion is measured in order to evaluate the amount of heat released as a function of time.

Compared to example 14, in which water alone is used as a flame retardant product, a flame retardant product is considered to be effective when the PHHR and the THR are reduced, and when the TTI increases.

The examples of Table 2 indicate that all of the flame retardant products according to the invention are effective against a forest fire. For all of these examples, the TTI increases and the HHR and THR decrease compared to reference example 14.

All of the examples according to the invention show a TTI greater than that measured in example 13, corresponding to a flame retardant product of the prior art.

Examples 4, 9, 10 and 11 show a greater TTI, a lower PHHR, and a THR less than those of example 13.

Example 8 generates a carbonaceous foam, but in an amount insufficient to effectively retard the spread of flames.

Tests conducted under actual application conditions confirmed the remarkable efficacy of a flame retardant product according to the invention.

As can be now be clearly seen, the invention provides a product that shows remarkable efficacy and is easy to implement. In particular, the addition of water to a concentrated product according to the invention makes it possible to activate the thixotropic agent and therefore to increase the viscosity in the absence of shear, i.e. after application to the support to be protected. Nevertheless, the application of shear at the time of application advantageously facilitates handling of the diluted product.

Moreover, after storage for a period of two years, the closed receptacles of the examples according to the invention show no signs of corrosion visible to the naked eye. Moreover, no occurrence of microorganisms in the concentrated flame retardant product is observed. Furthermore, for examples 1 to 5, 9 and 10, no decantation of the components, and in particular of the provided sugars, is observed in the concentrated flame retardant product.

Of course, the invention is not limited to the embodiments described and shown, which are for illustrative, not limitative, purposes. In particular, other hydroxylated carbon-based components, intumescent agents, and thixotropic agents may be used.

Furthermore, it is preferable to use a single product in order to obtain the intumescent property and the hydrating property, in particular a phosphate. However an "intumescent agent suitable for at least partially dehydrating the hydroxylated carbon-based component" also covers a mixture of an intumescent product and a hydrating product.

TABLE 1

| | | Concentrated flame retardant product (CP) | | | | | |
|---|---|---|---|---|---|---|---|
| Ex. | Raw material comprising a hydroxylated carbon-based component | APP/S ratio (*) | Content of xanthan gum % | Content of hydroxylated carbon-based component (CC) % | APP/CC ratio | Viscosity at 4 rpm (cP) | Viscosity at 100 rpm (cP) |
| 1 | Beet molasses[(1)] | 1.5 | 8.3 | 19.5 | 2.82 | 400 | 420 |
| 2 | Beet molasses[(1)] | 1.5 | 12.5 | 18.6 | 2.82 | 810 | 810 |
| 3 | Beet molasses[(1)] | 1.5 | 12.5 | 18.6 | 2.82 | 810 | 810 |
| 4 | Beet molasses[(1)] | 1.5 | 12.5 | 18.6 | 2.82 | 810 | 810 |
| 5 | Beet molasses[(1)] | 1.5 | 16.7 | 17.6 | 2.84 | 1520 | 1500 |
| 6 | Sorbitol | 0.667 | 12.5 | 35.2 | 0.99 | 890 | 890 |
| 7 | Sorbitol | 0.667 | 16.7 | 35.2 | 0.99 | 970 | 970 |
| 8[(3)] | Xylose | 1.5 | 12.5 | 3.2 | 16.41 | / | / |
| 9 | Beet molasses[(2)] | 1.5 | 12.5 | 18.6 | 2.82 | / | / |
| 10 | Sugarcane molasses | 1.5 | 12.5 | 16.8 | 3.13 | / | / |
| 11 | Saccharose | 1.5 | 12.5 | 18.6 | 2.82 | / | / |
| 12 | Saccharose and glucose | 1.5 | 12.5 | 16.8 | 3.13 | / | / |
| 13[(3)] | N.A. | — | / | 0 | — | / | / |
| 14[(3)] | Water | — | / | 0 | — | / | / |

| | Diluted flame retardant product (DP) | | | | | | |
|---|---|---|---|---|---|---|---|
| Ex. | Weight of CP/ weight of DP (%) | Viscosity at 4 rpm (cP) | Viscosity at 100 rpm (cP) | Adhesion capacity (g) | TTI (s) | PHHR (kW/m$^2$) | THR (kJ/m$^2$) |
| 1 | 6 | 375 | 150 | | | | |
| 2 | 2 | 220 | 220 | | | | |
| 3 | 4 | 250 | 250 | | | | |
| 4 | 6 | 3300 | 450 | 84.5 | 174 | 155.4 | 14.7 |
| 5 | 6 | 8500 | 1000 | | | | |
| 6 | 6 | 350 | 350 | 66.7 | 138 | 186.6 | 17.9 |
| 7 | 6 | 3320 | 400 | | | | |
| 8[(3)] | 6 | / | / | 64.7 | 148 | 177.1 | 17.4 |
| 9 | 6 | / | / | / | 138 | 157.4 | 15.8 |
| 10 | 6 | / | / | / | 174 | 146.6 | 12.2 |
| 11 | 6 | / | / | / | 189 | 168.9 | 11.3 |
| 12 | 6 | / | / | / | 182 | 181.1 | 11.4 |
| 13[(3)] | 20 | / | / | / | 110 | 169.1 | 16.8 |
| 14[(3)] | 100 | / | / | 27.5 | 86 | 209.4 | 21.1 |

(*) Ratio of the content by weight of the solution of APP to the content by weight of saturated solution of the hydroxylated carbon-based component (S)
[(1)]GOLDSAFT brand molasses
[(2)]FRANCE MELASSE brand molasses
[(3)]Product not part of the invention

The invention claimed is:

1. A flame retardant product intended to be diluted and consisting of an aqueous solution comprising:
   a hydroxylated carbon-based component,
   an intumescent agent suitable for at least partially or even completely dehydrating the hydroxylated carbon-based component in such a way as to generate, under the effect of heat, a carbonaceous foam,
   between 5% and 20% by weight of a thixotropic agent, selected to have a viscosity that increases as a result of water being added in the absence of shear,
   the solution having a sufficient concentration of the hydroxylated carbon-based component and the intumescent agent so that an addition of water to said solution increases the viscosity thereof in the absence of shear, and so that shear applied to the corresponding diluted solution decreases the viscosity thereof,
   the content by weight of the hydroxylated carbon-based component being greater than 12.5%,
   the flame retardant product being obtained by a method comprising the following successive steps:
   a) preparation of a composition comprising the intumescent agent the hydroxylated carbon-based component and water, the total content by weight of the hydroxylated carbon-based component and of the intumescent agent in the composition being greater than 95% of the saturation weight content at which saturation is reached,
   b) mixing of the thixotropic agent with the composition such as to obtain the aqueous solution.

2. The flame retardant product as claimed in claim 1, wherein the hydroxylated carbon-based component is selected from the group composed of carbohydrates, polyols, osamines and mixtures thereof and/or the intumescent agent comprises an element selected from the group composed of halogens, phosphorus, nitrogen, sulfur, zinc, aluminum, magnesium and mixtures thereof and/or the thixotropic agent is selected from the group composed of xanthan gum, gum arabic, Senegal gum, cellulose ethers and mixtures thereof.

3. The flame retardant product as claimed in claim 2, wherein the carbon-based component is selected from the group composed of saccharose, glucose, xylose, sorbitol, pentaerythritol, maltose, arabinose and mixtures thereof, and/or the intumescent agent is selected from the group composed of ammonium polyphosphate, diammonium phosphate, monoammonium phosphate, phosphoric acid, sulfuric acid, boric acid, urea phosphate, melamine phosphate, ammonium sulfate, ammonium borate and mixtures thereof, and/or the thixotropic agent is xanthan.

4. The flame retardant product as claimed in claim 3, wherein the carbon-based component is derived from a sugar extraction process of a plant, and/or the intumescent agent is ammonium polyphosphate.

5. The flame retardant product as claimed in claim 1, wherein the carbon-based component comprises sugar, less than 10% by weight of the sugar being crystallizable.

6. The flame retardant product as claimed in claim 1, wherein the hydroxylated carbon-based component comprises saccharose and glucose and fructose, the total content by weight of saccharose, glucose and fructose being greater than 5% by weight percentage based on the weight of the flame retardant product.

7. The flame retardant product as claimed in claim 6, wherein the glucose content is greater than 5% by weight percentage based on the weight of the flame retardant product.

8. The flame retardant product as claimed in claim 6, wherein the saccharose content is greater than 5% by weight percentage based on the weight of the flame retardant product.

9. The flame retardant product as claimed in claim 6, wherein the fructose content is greater than 5% by weight percentage based on the weight of the flame retardant product.

10. The flame retardant product as claimed in claim 1, comprising, by weight, greater than 5% and less than 20% of xanthan gum.

11. The flame retardant product as claimed in claim 1, wherein less than 20% by weight of the thixotropic agent is hydrated.

12. The flame retardant product as claimed in claim 1, wherein the content by weight of the hydroxylated carbon-based component is greater than 15%.

13. The flame retardant product as claimed in claim 12, wherein the content by weight of the hydroxylated carbon-based component is greater than 20%.

14. The flame retardant product as claimed in claim 13, wherein the content by weight of the hydroxylated carbon-based component is greater than 25%.

15. The flame retardant product as claimed in claim 1, wherein the intumescent agent is ammonium polyphosphate, the thixotropic agent is xanthan gum, and the hydroxylated carbon-based component comprises saccharose and glucose and fructose.

16. The flame retardant product according to claim 1, comprising more than 35% of the intumescent agent.

17. The flame retardant product according to claim 1, the intumescent agent and the hydroxylated carbon-based component saturating the aqueous solution.

18. An extinguishing device comprising:
a tank containing a flame retardant product as claimed in claim 1,
a sprinkling device connected to said tank, and
optionally a device for diluting the product coming from the tank and being fed to the sprinkling device.

19. The extinguishing device as claimed in claim 18, selected from the group composed of:
a fire suppression aircraft,
a fire suppression helicopter,
a firefighting truck,
a stationary spray head of the sprinkler type.

20. A method for producing a flame retardant product as claimed in claim 1, comprising the following successive steps:
a) preparation of an aqueous solution comprising an intumescent agent, a hydroxylated carbon-based component and water, so as to form an intumescent system generating, under the effect of heat, a carbonaceous foam,
b) mixing of a thixotropic agent with the solution obtained in step a), in a quantity such that the weight content of the thixotropic agent in the solution ranges between 5% and 20%, the solution obtained at the end of step a) being such that the total content by weight of the hydroxylated carbon-based component and the intumescent agent is greater than 95% of the saturation weight content at which saturation is reached, the thixotropic agent being selected so that an addition of water to the solution obtained at the end of step b) increases the viscosity thereof in the absence of shear, and so that shear applied to the solution obtained at the end of step b) decreases the viscosity thereof.

21. The method as claimed in claim 20, wherein the hydroxylated carbon-based component is in liquid form.

22. The method as claimed in claim 21, wherein the hydroxylated carbon-based component is in the form of a liquid saturated with the hydroxylated carbon-based component.

23. The method as claimed in claim 20, wherein in step a), less than 10% of free water is added by weight percentage based on the weight of the intumescent system.

24. The method as claimed in claim 20, wherein in step a), the solution is obtained by mixing a raw material comprising the hydroxylated carbon-based component with a raw material comprising the intumescent agent.

25. The method as claimed in claim 24, wherein the raw material comprising the hydroxylated carbon-based component is molasses.

26. The method as claimed in claim 24, wherein the raw material comprising the intumescent agent is ammonium polyphosphate.

27. The method as claimed in claim 24, wherein the ratio of the weight of the raw material comprising the intumescent agent to the weight of the raw material comprising the hydroxylated carbon-based component is greater than 0.3, greater than 0.6 and/or less than 2, or less than 1.6.

28. A method for fighting a fire comprising the following steps:
i) dilution of a concentrated flame retardant product as claimed in claim 1 so as to obtain a diluted flame retardant product,
ii) application of shear to the diluted flame retardant product so as to reduce the viscosity thereof,
iii) application of the diluted and sheared flame retardant product to the support.

29. The method for fighting a fire as claimed in claim 28, wherein the support is selected from a tree, a storage tank wall, a building wall, and waste.

30. The method for fighting a fire as claimed in claim 28, wherein the support comprises less than 50% of cellulose.

31. A flame retardant product consisting of an aqueous solution comprising:
more than 12.5% of a hydroxylated carbon-based component,
more than 35% of an intumescent agent suitable for at least partially or even completely dehydrating the hydroxylated carbon-based component in such a way as to generate, under the effect of heat, a carbonaceous foam,
between 5% and 20% of a thixotropic agent, selected to have a viscosity that increases as a result of water being added in the absence of shear, the intumescent agent and the hydroxylated carbon-based component saturating the aqueous solution so that an addition of water to said solution increases the viscosity thereof in the absence of shear.

\* \* \* \* \*

UNITED STATES PATENT AND TRADEMARK OFFICE
CERTIFICATE OF CORRECTION

| | | |
|---|---|---|
| PATENT NO. | : 11,945,988 B2 | Page 1 of 1 |
| APPLICATION NO. | : 16/479038 | |
| DATED | : April 2, 2024 | |
| INVENTOR(S) | : Eric Issartel | |

It is certified that error appears in the above-identified patent and that said Letters Patent is hereby corrected as shown below:

On the Title Page

Item (30) Foreign Application Priority Data: please delete "January 23, 2018 (FR)................1750513" and insert --January 23, 2017 (FR)..................1750513--

Signed and Sealed this
Eleventh Day of June, 2024

*Katherine Kelly Vidal*

Katherine Kelly Vidal
*Director of the United States Patent and Trademark Office*